United States Patent
Lewis et al.

(10) Patent No.: US 9,767,281 B2
(45) Date of Patent: Sep. 19, 2017

(54) DEVICE AND METHOD FOR PROCESSING DATA

(71) Applicant: Robert Bosch GmbH, Stuttgart (DE)

(72) Inventors: Matthew Lewis, Reutlingen (DE); Robert Szerwinski, Esslingen (DE); Jamshid Shokrollahi, Ludwigsburg (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 14/224,464

(22) Filed: Mar. 25, 2014

(65) Prior Publication Data

US 2014/0298459 A1    Oct. 2, 2014

(30) Foreign Application Priority Data

Mar. 28, 2013   (DE) ........................ 10 2013 205 542

(51) Int. Cl.
| | |
|---|---|
| *G06F 21/75* | (2013.01) |
| *G09C 1/00* | (2006.01) |
| *G06F 21/55* | (2013.01) |
| *H04L 9/00* | (2006.01) |

(52) U.S. Cl.
CPC ............ *G06F 21/556* (2013.01); *G06F 21/75* (2013.01); *G09C 1/00* (2013.01); *H04L 9/003* (2013.01)

(58) Field of Classification Search
None
See application file for complete search history.

(56) References Cited

U.S. PATENT DOCUMENTS

| | | | | |
|---|---|---|---|---|
| 2002/0154767 A1* | 10/2002 | Endo | .................... | G06Q 20/341 380/28 |
| 2005/0055563 A1* | 3/2005 | Fischer | .................. | H04L 9/003 713/194 |
| 2007/0101172 A1* | 5/2007 | Ohyama | ................. | G06F 21/75 713/300 |

(Continued)

OTHER PUBLICATIONS

AES Cryptography Standard, (c.f. http://csrc.nist.gov/publications/fips/fips197/fips-197.pdf, Chapter 5.1.1).

*Primary Examiner* — Farid Homayounmehr
*Assistant Examiner* — Thanh T Le
(74) *Attorney, Agent, or Firm* — Norton Rose Fulbright US LLP; Gerard Messina

(57) ABSTRACT

A device for processing data, the device having an input interface for receiving input data and a processing module for processing data, characterized in that an encoding unit is provided, which is configured to encode data words received at the input interface as input data, in order to obtain encoded data words; measured values characterizing the encoded data words and/or their processing by the device being ascertainable for encoded data words as a function of at least one physical variable of the device; the encoding unit being configured to encode the data words in such a manner, that a specifiable proportion of all measured values, which may be at least approximately 50% of all measured values, exhibit a difference from the setpoint value, which is less than or equal to a specifiable threshold value; and the processing module is configured to process the encoded data words.

25 Claims, 5 Drawing Sheets

(56) References Cited

U.S. PATENT DOCUMENTS

| | | | |
|---|---|---|---|
| 2008/0260042 A1* | 10/2008 | Shah | H04N 19/197 375/240.25 |
| 2009/0147862 A1* | 6/2009 | Ohyama | G06K 19/07363 375/257 |
| 2010/0031124 A1* | 2/2010 | Shinagawa | H03M 13/036 714/777 |
| 2011/0080958 A1* | 4/2011 | Sprljan | H04N 19/94 375/240.25 |
| 2016/0071228 A1* | 3/2016 | Wendel | G06T 1/0007 348/148 |
| 2016/0156367 A1* | 6/2016 | Kalevo | H03M 7/3055 375/240 |

* cited by examiner

| S1 | S2 | S3 |
|---|---|---|
| 1 | (0, 0, 0, 0) | (0, 0, 0, 0, *0, 1, 1*) |
| 2 | (0, 0, 0, 1) | (0, 0, 0, 1, *0, 0, 1*) |
| 3 | (0, 0, 1, 0) | (0, 0, 1, 0, *0, 0, 1*) |
| 4 | (0, 0, 1, 1) | (0, 0, 1, 1, *0, 0, 0*) |
| 5 | (0, 1, 0, 0) | (0, 1, 0, 0, *0, 0, 1*) |
| 6 | (0, 1, 0, 1) | (0, 1, 0, 1, *0, 0, 0*) |
| 7 | (0, 1, 1, 0) | (0, 1, 1, 0, *0, 0, 0*) |
| 8 | (0, 1, 1, 1) | (1, 0, 0, 0, *1, 0, 0*) |
| 9 | (1, 0, 0, 0) | (1, 0, 0, 0, *0, 0, 1*) |
| 10 | (1, 0, 0, 1) | (1, 0, 0, 1, *0, 0, 0*) |
| 11 | (1, 0, 1, 0) | (1, 0, 1, 0, *0, 0, 0*) |
| 12 | (1, 0, 1, 1) | (0, 1, 0, 0, *1, 0, 0*) |
| 13 | (1, 1, 0, 0) | (1, 1, 0, 0, *0, 0, 0*) |
| 14 | (1, 1, 0, 1) | (0, 0, 1, 0, *1, 0, 0*) |
| 15 | (1, 1, 1, 0) | (0, 0, 0, 1, *1, 0, 0*) |
| 16 | (1, 1, 1, 1) | (0, 0, 0, 0, *1, 1, 0*) |

Fig. 6

DEVICE AND METHOD FOR PROCESSING DATA

RELATED APPLICATION INFORMATION

The present application claims priority to and the benefit of German patent application no. 10 2013 205 542.0, which was filed in Germany on Mar. 28, 2013, the disclosure of which is incorporated herein by reference.

FIELD OF THE INVENTION

The present invention relates to a device for processing data, the device having an input interface for receiving input data and a processing module for processing data. The present invention also relates to a method for operating such a device.

SUMMARY OF THE INVENTION

An object of the present invention is to improve a device and a method of the type mentioned at the outset, in order to provide increased security from attacks, in particular, side channel attacks.

In the case of the device of the type mentioned at the outset, this object is achieved by providing an encoding unit, which is configured to encode data words received at the input interface as input data, in order to obtain encoded data words; measured values characterizing the encoded data words and/or their processing by the device being ascertainable for encoded data words as a function of at least one physical variable of the device; the encoding unit being configured to encode the data words in such a manner, that a specifiable proportion of all measured values, which may be at least approximately 50% of all measured values, exhibit a difference from the setpoint value, which is less than or equal to a specifiable threshold value; and the object is achieved by configuring the processing module to process the encoded data words.

According to the present invention, it has been recognized that when the data words to be processed are encoded according to the principle proposed above, side channel attacks on the device of the present invention may be rendered more difficult or impossible. Side channel attacks are known to be used on particular implementations of data processing devices and methods, such as implementations of cryptographic algorithms and the like; advantage being taken of the fact that one or more observable or measurable physical variables of the device are a function of the processed data and therefore allow inferences to be made about the processed data, such as a secret cryptographic key and the like.

Thus, in the course of a side channel attack, e.g., the above-mentioned measured values, which represent the encoded data words, and/or which characterize a processing of these encoded data words by the device, are metrologically acquired, and an attacker may attempt to obtain information from these measured values, about the data actually processed.

According to the present invention, it has been recognized that it is possible to provide encoding of the data words prior to their processing, such that a side channel attack on the device is rendered more difficult. The principle of the present invention is based on the premise that the encoding is undertaken with the objective that the measured values to be ascertained for the side channel attack become less "distinctive" or have a lower correlation to the data actually processed. In other words, the encoding of the present invention provides that the data actually processed, namely, the encoded data words, are adapted to the specific implementation of the device in such a manner (in comparison with the non-encoded data words), that measured values used for a side channel attack have a lower information content, i.e., a lower correlation to the processed data words. Such encoding may also be referred to as so-called "leakage preserving code," since it reduces or prevents "leakage" in the crytographic sense.

In one specific embodiment, it is provided that the setpoint value for all measured values be selected to be the same, which allows a simple determination of a code in question.

In one particular specific embodiment, an average value over all possible values of the measured values is selected as a setpoint value. In this sense, "all possible values of the measured values" is understood to be the amount of all measured values, as result during the processing of all encoded data words that are provided by the encoding of the present invention. The amount of all possible measured values may be ascertained, for example, in a test set-up at a specific implementation of the device of the present invention, in that in the case of a given encoding, data processing by the device is carried out in such a manner, that each encoded data word is supplied once to the processing module for processing. During the processing of a corresponding data word, a particular measured value, which characterizes the data word or the processing of the data word in the device, is accordingly obtained. The measured values obtained in this manner may be ascertained according to a specific embodiment, and ultimately, e.g., their average value may be used as a setpoint value for the encoding of the present invention. For example, the encoding of the present invention, thus an assignment of encoded data words to non-encoded data words, may also be ascertained step-by-step. This assignment may be undertaken, for example, in an iterative method, in order to refine, step-by-step, the encoded data words, that is, the transformation, which is carried out by the encoding unit of the present invention within the scope of the encoding, until a difference of one or more particular measured values from the setpoint value satisfies the threshold value criterion of the present invention. It is then ensured that the measured values derivable from the data words encoded in such a way only differ slightly from the setpoint value, so that a side channel attack, which is undertaken by analyzing the measured values or values derived from them, is rendered considerably more difficult or impossible.

It is particularly advantageous that the principle of the present invention is not based on the use of random numbers or pseudo-random numbers. On the contrary, the encoding of the present invention represents a deterministic rule for transforming the data to be processed, into the encoded data words. Special encoding may be ascertained and used for each specific implementation of the device. It is also conceivable for several possible types of encoding to be ascertained for a specific implementation of the device, and for these to change during operation of the device, thereby increasing the security from side channel attacks.

In one further advantageous specific embodiment, it is provided that the setpoint value not be selected to be equal for all measured values. This means that according to the specific embodiment in question, the encoding of the present invention provides degrees of freedom to the effect that different setpoint values may be provided for different measured values. Consequently, e.g., instances of asymmetry may advantageously be taken into consideration in the implementation and in the acquisition of the measured values. For example, in the processing of a first group of encoded data words, it is conceivable for measured values to be obtainable, which have a larger information content regarding the processed data than in the case of processing a second group of encoded data words. In this case, it may be useful to provide different setpoint values for the different groups of encoded data words, in order to reduce or compensate for these instances of asymmetry, which may be with the objective that regardless of the instances of asymmetry, all possible measured values have a similar information content regarding the processed data.

In a further advantageous specific embodiment, a different threshold value is provided, in each instance, for at least two measured values or data words assigned to these measured values. In this manner, a further degree of freedom regarding the encoding may be provided, which allows the transformation of the present invention, which forms the basis of the encoding, to be more easily retrieved.

In a further advantageous specific embodiment, the measured values are scalar or vector variables, or they are in matrix form. For example, the measured values may represent an electrical energy consumption of the device or of at least one component of the device. In this case, an attacker of the device may ascertain this electrical energy consumption as a measured value in the sense of the present invention, in order to carry out a side channel attack. In this specific application case, the present invention's encoding of the encoded data words ultimately processed in the processing module has an advantageous effect that the corresponding measured values for the electrical energy consumption of the device or of the at least one component only differ slightly from one another, which means that a side channel attack is rendered, in turn, more difficult.

An example of measured values in vector form is, e.g., an application scenario, in which a plurality of electrical energy consumption values of different components or, in general, parts of the device are ascertained for each processed, encoded data word. Of course, such a plurality of measured values may also be organized in matrix form. A further example, in which a representation of measured values in matrix form appears to be useful, is, for example, the ascertainment of electromagnetic fields emitted by the device. In this case, e.g., a plurality of field probes, which are used for measuring the electromagnetic fields, may be positioned over this device during operation of the device, and corresponding measured values of the individual field probes may be assigned, for example, to individual matrix elements of a measured value present in matrix form in the sense of the present invention.

Of course, depending on the form of the measured values in the sense of the present invention, the comparison operation for ascertaining the difference of the measured values from the setpoint value must also be selected appropriately. The same applies to the setpoint value. For scalar variables, e.g., simple subtraction with subsequent absolute-value generation may be provided, in order to evaluate a difference between a measured value, e.g., a value for the electrical energy consumption of the device, and a corresponding setpoint value. In the case of variables for the measured values in vector or matrix form, other suitable functions may correspondingly be defined, in order to determine the respective difference from a set point value (e.g., setpoint vector, setpoint matrix, and the like).

In general, in the sense of the present invention, the term "measured values" may also be understood to mean, in accordance with a specific embodiment, variables derived from physical measured values. For example, a Hamming distance or a Hamming weight, which is derived from one or more measured values of the device, also represents a "measured value" in the sense of the present invention.

This means that in a corresponding variant of the present invention, the encoding may also be designed in such a manner, that the measured values, which do not directly correspond to physically measurable values, but only values derived from them, satisfy the threshold value criterion of the present invention. This means that the encoding of the present invention may be implemented in such a manner, that, e.g., the physical measured values, which represent the encoded data words or their processing, do not satisfy the threshold value criterion of the present invention, but the variables derived from them, such as the Hamming distance or the Hamming weight, do satisfy the threshold value criterion of the present invention.

In a further specific embodiment, the encoding unit is configured to encode the data words in such a manner, that a specifiable proportion of all encoded data words among themselves, which may be at least approximately 50% of all encoded data words, have a specifiable Hamming distance and/or a specifiable Hamming weight. According to the present invention, it has been recognized that the transformation of the data words obtained on the input side, by the proposed encoding, which determines the criteria regarding Hamming distance or Hamming weight, and results in a lower leakage of information regarding the processed data inside the processing module of the present invention, may also contribute, in particular, to satisfying the threshold value criteria of the present invention for the measured values.

In the present specific embodiment, "all encoded data words" may be understood to mean the amount of all theoretically occurring, encoded data words. If, for example, j data words obtained on the input side are present, these j data words obtained on the input side may be correspondingly assigned j encoded data words by the encoding unit. Accordingly, in one specific embodiment, the encoding may be carried out in such a manner, that at least approximately 50% of the j encoded data words have, among themselves, a specifiable Hamming distance. Alternatively, or in addition, the encoding may be carried out in such a manner, that at least approximately 50% of the j encoded data words have a specifiable Hamming weight.

In one advantageous specific embodiment, it is provided that the processing module have at least one register, which is configured to store at least one encoded data word at least temporarily. This means that a simple specific embodiment of the present invention relates to a device, which has an input interface and an encoding unit of the present invention, and in which the processing of the present invention provides, e.g., at least temporary storage in the register. Thus, in this specific embodiment, a data word (or also a plurality of data words) encoded according to the present invention is stored at least temporarily in a register or another memory, namely, in the encoded form, so that the encoded data words may be subsequently fetched out and processed further. For example, a subsequent cryptographic method may read out the corresponding register and process the data further.

Alternatively, or in addition, the processing module of the present invention may also include at least one cryptographic unit, which is configured to execute at least a portion of a cryptographic method. For example, the processing module may have a cryptographic unit, which is configured to execute the complete AES (advanced encryption standard) algorithm.

In one further specific embodiment, it may be provided that the processing module have a cryptographic unit, which is configured to execute a portion of a cryptographic method, e.g. to execute a nonlinear substitution operation, as is also the object of the so-called SubBytes( ) function of the AES Cryptography Standard.

In a further specific embodiment, it may be provided that the processing module have a data bus or take the form of a data bus, in particular, a parallel data bus. In this case, data transmission over the data bus is protected by the encoding of the present invention from side channel attacks.

In one further advantageous variant, it is provided that the encoding unit be configured to encode the data words by adding a specifiable number of bits to each data word. In this connection, the value of the correspondingly added bits may be selected as a function of the encoding of the present invention. In other words, the present invention's addition of a specifiable number of bits (and selection of their respective value) provides a number of degrees of freedom for the encoding of the present invention, which allows a desired Hamming weight and/or desired Hamming distance to be set for one or more encoded data words. The actual information of the unencoded data words is not lost in the process, since according to the present invention, only new bits are added. In some instances, further bits may be alternatively or additionally added, in order to satisfy the threshold value criterion of the present invention for the measured values with regard to the setpoint value.

In a further advantageous specific embodiment, it is provided that the encoding unit be configured to select the specifiable number of added bits or their values in such a manner, that the specifiable proportion of all of the encoded data words among themselves have the specifiable Hamming distance and/or the specifiable Hamming weight.

The number of different digit positions of two code words compared to each other is referred to as Hamming distance. Therefore, in the case of a binary code and two corresponding code words, the Hamming distance corresponds to the number of different bit positions of the compared code words. The Hamming weight is understood to be the Hamming distance from the zero vector. Accordingly, in the case of a binary code, the Hamming weight corresponds to the number of digit positions of the code word in question that are different from zero, that is, the number of bits having the value of one.

In a further advantageous specific embodiment, it is provided that the encoding unit be configured to assign the data words listed in column S2 of the following table the encoded data word listed in the corresponding line of column S3 of the table. In each instance, individual bit positions of the data words are separated from one another by commas, and a data word is set in parentheses ( ).

| S2 | S3 |
|---|---|
| (0, 0, 0, 0) | (0, 0, 0, 0, 1, 1) |
| (0, 0, 0, 1) | (0, 0, 0, 1, 0, 0, 1) |
| (0, 0, 1, 0) | (0, 0, 1, 0, 0, 0, 1) |
| (0, 0, 1, 1) | (0, 0, 1, 1, 0, 0, 0) |
| (0, 1, 0, 0) | (0, 1, 0, 0, 0, 0, 1) |
| (0, 1, 0, 1) | (0, 1, 0, 1, 0, 0, 0) |
| (0, 1, 1, 0) | (0, 1, 1, 0, 0, 0, 0) |
| (0, 1, 1, 1) | (1, 0, 0, 0, 1, 0, 0) |
| (1, 0, 0, 0) | (1, 0, 0, 0, 0, 0, 1) |
| (1, 0, 0, 1) | (1, 0, 0, 1, 0, 0, 0) |
| (1, 0, 1, 0) | (1, 0, 1, 0, 0, 0, 0) |
| (1, 0, 1, 1) | (0, 1, 0, 0, 1, 0, 0) |
| (1, 1, 0, 0) | (1, 1, 0, 0, 0, 0, 0) |
| (1, 1, 0, 1) | (0, 0, 1, 0, 1, 0, 0) |
| (1, 1, 1, 0) | (0, 0, 0, 1, 1, 0, 0) |
| (1, 1, 1, 1) | (0, 0, 0, 0, 1, 1, 0) |

In one further advantageous specific embodiment, at least part of the device takes the form of an integrated circuit (IC), which may be implemented using CMOS (complementary metal oxide semiconductor) technology. The functionality of the present invention may also be implemented in an ASIC or FPGA.

The object of the present invention is also achieved by a method described herein. Furthermore, the object of the present invention is achieved by a method also described herein.

Further advantageous specific embodiments are the subject matter of the further descriptions herein.

In the following, exemplary embodiments of the present invention are explained with reference to the drawings.

BRIEF DESCRIPTION OF THE DRAWINGS

FIG. 6 shows a schematic of a table for illustrating encoding according to one specific embodiment.

DETAILED DESCRIPTION

Figure 1:
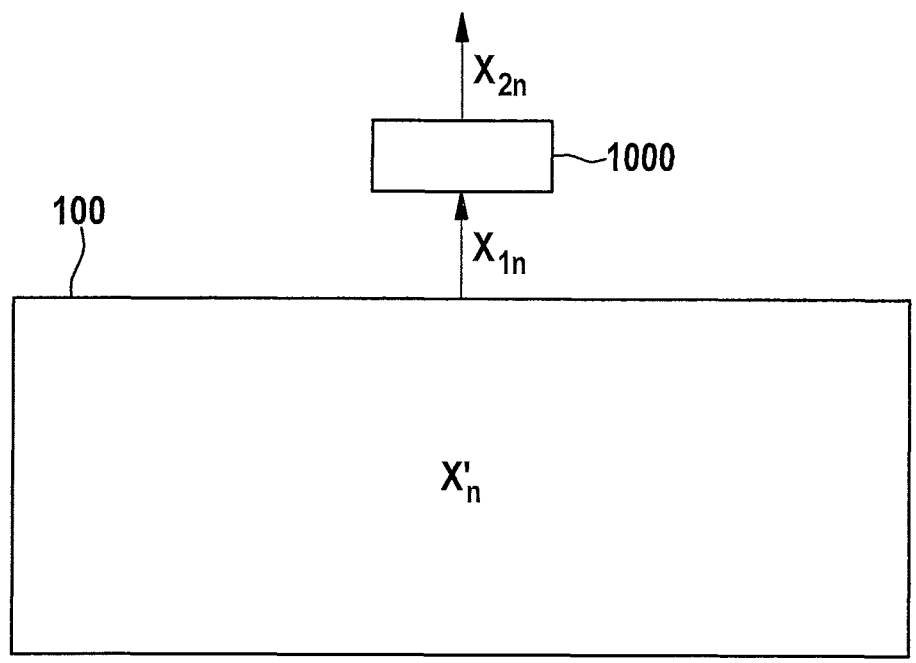
FIG. 1 show a schematic of a specific embodiment of a device according to the present invention.

FIG. 1 schematically shows a specific embodiment of a device 100 according to the present invention for processing data. Device 100 is implemented, for example, as an integrated circuit (IC), using, e.g., CMOS technology.

During the processing of the data in device 100, measured values X1n, which represent data words Xn' that are presently being processed in device 100, may be ascertained. These measured values may be obtained using methods known per se for ascertaining physical variables. For example, an electrical energy consumption of device 100 or of individual components of it may be obtained as measured value X1n. In this case, for the processing of one of each data word Xn' inside of device 100, a corresponding, measured electrical energy value X1n may be obtained. As an alternative to an electrical energy consumption, e.g., a current consumption and the like may be used as a measured value when the operating voltage of device 100 is known. The current consumption may be derived, e.g., from a metrologically measured voltage drop across a shunt resistor (low-resistance measuring resistor, not shown), which is connected in series to an electrical supply line (not shown) of device 100. As an alternative to measured electrical energy values or current measurement and the like, measured values may also be obtained, for example, by measuring electric fields of device 100, magnetic fields of device 100 or electromagnetic fields of device 100 or combinations of them. Of course, in the case of suitable spatial resolution of the measuring method used, in each instance, only one component of device 100 may also be taken as a basis for the measurement. For example, when device 100 takes the form of an integrated circuit, it may be of interest to obtain specific measured values X1$n$ from such components or regions of device 100, which contain the components to be acted upon by a side channel attack, such as an AES core or the like, which execute, e.g., a cryptographic method or a portion of it.

In one advantageous specific embodiment, the measured values are scalar (e.g., a measured current value) or vector (e.g., a plurality of measured current values of different circuit components) quantities, or they are in matrix form.

In the sense of the present invention, apart from values ascertainable by physical measurement, measured values X2$n$, which may be derived from physically ascertainable values X1$n$, e.g., by computational methods, etc., are also understood to be a measured value. For example, an attacker may provide a measuring or processing module 1000, which measures one or more physical variables X1$n$ of device 100, and which calculates values X2$n$ derived from them. These derived values X2$n$ are also referred to as measured values in the sense of the present invention. These derived values X2$n$ may be, for example, a Hamming distance or a Hamming weight, etc. This may then be the case, for example, when electromagnetic emissions of individual bus lines of a parallel data bus are measured by device 1000. In this case, e.g., one measured value is obtained per bus line, and in the case of, e.g., 8 bus lines, a total of 8 measured values X1$n$ are available, from which, e.g., a Hamming distance from other measured values X2$n$ obtained in the same manner or a Hamming weight may be calculated with the aid of device 100.

According to the present invention, it is provided that device 100 have an encoding unit 130, cf. FIG. 2$a$, which is configured to encode data words Xn received at an input interface 110 as input data X, in order to obtain encoded data words Xn'; and that a processing module 120 of device 100 be configured to process encoded data words Xn'. In this manner, it is advantageously provided that measured values X1$n$, X2$n$ (FIG. 1), as are ascertainable, e.g., in the course of side channel attacks, are a function of encoded data words Xn' or the processing of encoded data words Xn' in device 100, and not directly a function of unencoded data words Xn, which are supplied to the encoding unit 130 of the present invention. Accordingly, when the encoding is suitably selected, it may be advantageously provided that measured values X1$n$, X2$n$ be less meaningful regarding the encoded data Xn' currently processed by device 100, which means that the side channel attack is rendered more difficult or impossible.

In particular, the present invention provides that encoding unit 130 be configured to encode data words Xn in such a manner, that a specifiable proportion of all measured values X1$n$, X2$n$, which may be at least approximately 50% of all measured values X1$n$, X2$n$, differ from a setpoint value Vn (FIG. 2$b$) by less than or equal to a specifiable threshold value S. Analyses of the Applicant have shown that in the case of such encoding, and when encoded data words Xn' are processed in processing module 120, the variables that are correspondingly technically measurable (measured values X1$n$) or the variables X2$n$ derivable from them are less meaningful regarding their information content with respect to non-encoded data words Xn, which means that the encoding of the present invention provides effective protection against side channel attacks.

Thus, the encoding of the present invention is also referred to as so-called leakage preserving code, because it reduces or prevents leakage in the cryptographic sense.

In contrast to methods, which are based on the use of random numbers or pseudo-random numbers for hindering side channel attacks and are therefore expensive, the principle of the present invention advantageously requires only a deterministic method, namely, the encoding by encoding unit 130 and the processing of the encoded data.

In one specific embodiment, input data X (FIG. 2$a$) may be present in the form of temporally sequential data words, e.g., data words Xn having a word length of, e.g., four bits. Other word lengths are possible, as well. Accordingly, input interface 110 directs input data X to its output in the form of data words Xn.

As is apparent from FIG. 2$a$, encoded data words Xn' are outputted at the output of encoding unit 130 and supplied to processing module 120 for processing. Correspondingly, processing module 120 outputs processed, encoded data words Yn' at its output.

FIG. 2$b$ shows an encoding unit 130 according to one specific embodiment. Encoding unit 130 advantageously has a specifiable setpoint value V and a specifiable threshold value S for evaluating measured values X1$n$, X2$n$, so that it may be checked if a current encoding already satisfies the threshold value criterion of the present invention regarding the difference of at least one measured value X1$n$, X2$n$ from setpoint value V.

In one particular specific embodiment, an average value over all possible values of measured values X1$n$ or X2$n$ is selected as setpoint value V. In this sense, "all possible values of the measured values" is understood to be the amount of all measured values X1$n$ or X2$n$, as results during processing of all encoded data words Xn' that are provided by the encoding of the present invention. The amount of all possible measured values may be ascertained, for example, in a test set-up at a specific implementation of device 100 of the present invention, in that in the case of a given encoding, data processing by device 100 or its module 120 is carried out in such a manner, that each encoded data word Xn' is supplied once to processing module 120 for processing. During the processing of a corresponding data word Xn', a particular measured value X1$n$ or X2$n$, which characterizes data word Xn' or the processing of the data word in the device, is accordingly obtained. The measured values obtained in this manner may be ascertained according to a specific embodiment, and ultimately, e.g., their average value may be used as a setpoint value for the encoding of the present invention. For example, the encoding of the present invention, thus, an assignment of encoded data words to non-encoded data words, may also be ascertained step-by-step. This assignment may be carried out, for example, in an iterative method, in order to refine, step-by-step, the encoded data words or the transformation, which is carried out by the encoding unit of the present invention within the scope of the encoding, until a difference of one or more determined, measured values from the setpoint value satisfies the threshold value criterion of the present invention. It is then ensured that the measured values X1$n$ or X2$n$ derivable from the data words Xn' encoded in such a way only differ slightly from the setpoint value, so that a side channel attack, which is undertaken by evaluating measured values X1n, X2n, is rendered considerably more difficult or impossible.

It is particularly advantageous that the principle of the present invention is not based on the use of random numbers or pseudo-random numbers. On the contrary, the encoding of the present invention represents a deterministic rule for transforming the data to be processed into the encoded data words. Special encoding may be ascertained and used for each specific implementation of device 100. It is also conceivable for several possible types of encoding to be ascertained for a specific implementation of the device, and for these to be changed during operation of the device, thereby further increasing the security from side channel attacks.

In one further advantageous, specific embodiment, it is provided that setpoint value V (FIG. 2b) not be selected to be equal for all measured values X1n, X2n. This means that according to the specific embodiment in question, the encoding of the present invention provides degrees of freedom to the effect that different setpoint values may be provided for different measured values. Consequently, e.g., instances of asymmetry may advantageously be taken into consideration in the implementation and the acquisition of the measured values. For example, in the processing of a first group of encoded data words, it is conceivable for measured values to be obtainable, which have a larger information content regarding the processed data than in the case of processing a second group of encoded data words. In this case, it may be useful to provide different setpoint values for the different groups of encoded data words, in order to reduce or compensate for these instances of asymmetry, which may be with the objective that regardless of the instances of asymmetry, all possible measured values have a similar information content regarding the processed data.

In a further advantageous specific embodiment, in each instance, a different threshold value S is provided for at least two measured values or data words assigned to these measured values. In this manner, a further degree of freedom regarding the encoding may be provided, which allows the transformation of the present invention, which forms the basis of the encoding, to be more easily retrieved.

In a further advantageous specific embodiment, measured values X1n, X2n are scalar or vector variables, or they are in matrix form. For example, the measured values may represent an electrical energy consumption of the device or of at least one component of the device. In this case, an attacker of the device may ascertain this electrical energy consumption as a measured value in the sense of the present invention, in order to carry out a side channel attack. In this specific application case, the encoding of the data words ultimately processed in the processing module in accordance with the present invention has the advantageous effect that the corresponding measured values for the electrical energy consumption of the device or of the at least one component only differ slightly from one another, which means that a side channel attack is rendered, in turn, more difficult.

An example of measured values in vector form is an application scenario, in which a plurality of electrical energy consumption values of different components or, in general, parts of device 100 are ascertained for each processed, encoded data word. Of course, such a plurality of measured values may also be organized in matrix form. A further example, in which a representation of measured values in matrix form appears to be useful, is, for example, the ascertainment of electromagnetic fields emitted by the device. In this case, e.g., a plurality of field probes, which are used for measuring electromagnetic fields, may be positioned over this device during operation of the device, and corresponding measured values of the individual field probes may be assigned, for example, to individual matrix elements of a measured value present in matrix form in the sense of the present invention.

Of course, depending on the form of the measured values in the sense of the present invention, the comparison operation for ascertaining the difference of the measured values from the setpoint value must also be selected appropriately. The same applies to the setpoint value. For scalar variables, e.g., simple subtraction with subsequent absolute-value generation may be provided, in order to evaluate a difference between a measured value, e.g., a value for the electrical energy consumption of the device, and a corresponding setpoint value. In the case of variables for the measured values in vector or matrix form, other suitable functions may correspondingly be defined, in order to determine the respective difference from a setpoint value (e.g., setpoint vector, setpoint matrix, and the like).

In another specific embodiment, encoding unit 130 is configured to encode data words Xn in such a manner, that all encoded data words Xn' have, among themselves, a specifiable Hamming distance. Alternatively, or in addition, it may be provided that the encoding be carried out in such a manner, that all encoded data words Xn' have a specifiable Hamming weight.

Other variants of the encoding by encoding unit 130 are also conceivable. This means that the present invention is not limited to encoding input data words Xn with the objective of obtaining the specifiable Hamming distance or the specifiable Hamming weight.

Figure 2A:
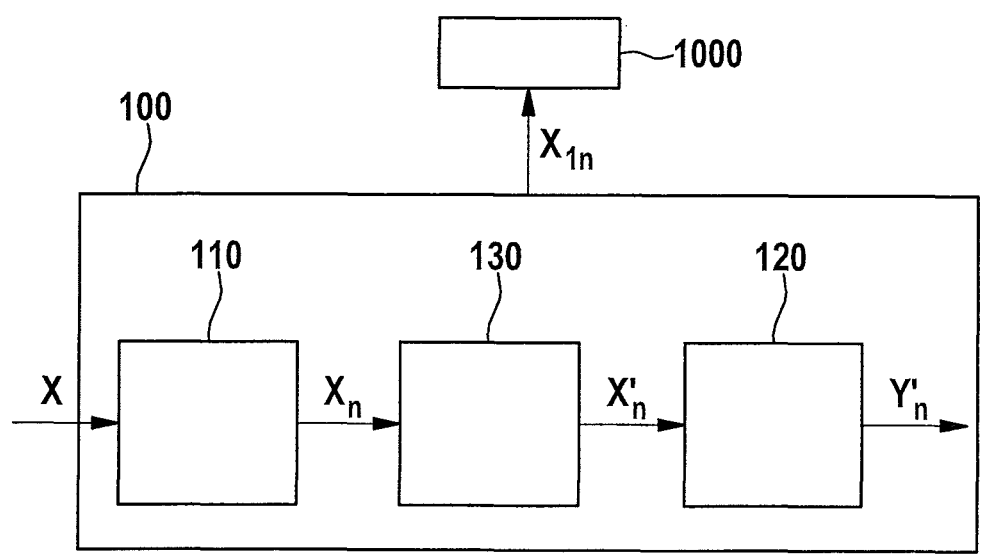
FIGS. 2a and 2b, in each instance, show a schematic of a specific embodiment of a device according to the present invention.
Figure 2B:
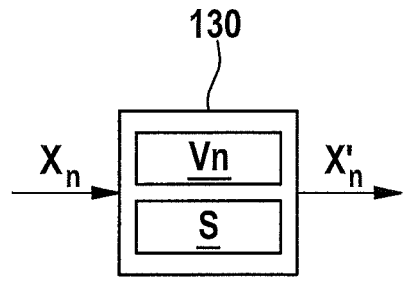
Figure 3A:
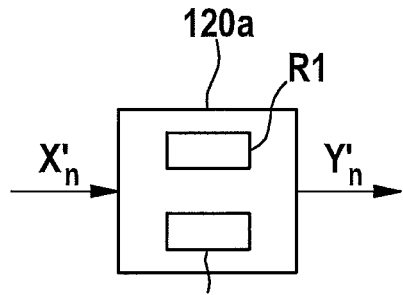
FIGS. 3a and 3b, in each instance, show a schematic of a specific embodiment of a processing module according to the present invention.

According to a specific embodiment, processing module 120 may be, e.g., a register. FIG. 3a shows a further specific embodiment, in which a variant 120a of the processing module 120 shown in FIG. 2a is illustrated. Processing module 120a has two registers R1, R2, which are configured to at least temporarily store encoded data words Xn' supplied to them on the input side, as are obtained from encoding unit 130. At a given time, processing module 120a outputs the encoded data words, which are stored in registers R1, R2, as "processed" encoded data Yn' via an output, for further processing. In the present case, since processing module 120a is formed as a pure storage device, there is the special feature that output data words Yn' of module 120a correspond to input data words Xn'.

Figure 3B:
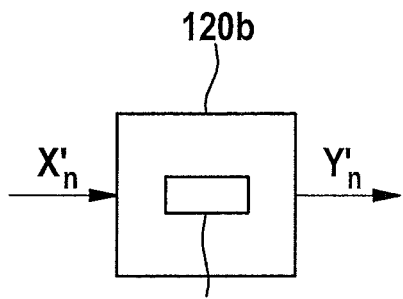

FIG. 3b shows a further specific embodiment 120b for a processing module according to the present invention. Processing unit 120b presently has a cryptographic unit 124, which may be, e.g., a unit for executing a portion of an algorithm of an encryption method. For example, cryptographic unit 124 may be configured to carry out a nonlinear substitution operation with the input data Xn' supplied to it, and to obtain corresponding output data Yn'. Such a nonlinear substitution operation is provided, for example, in the so-called SubBytes( ) function of the AES (advanced encryption standard). Accordingly, a variant of the present invention according to FIG. 3b may be used for executing the relevant portions of the AES algorithm.

In a further specific embodiment, processing module 120 may be a data bus (serial or parallel), or in general, a circuit component to which encoded data words Xn' may be supplied. In a further specific embodiment, components 120 and 130 may also be functionally combined with one another.

Figure 4A:
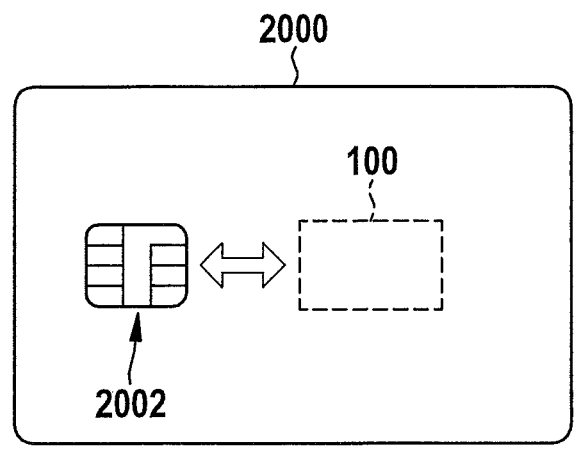
FIGS. 4a and 4b show schematics of units including a device according to the present invention.

FIG. 4a shows a further field of application of the present invention. A chip card 2000 illustrated, on which a device 100 of the present invention is situated. Device 100 is in data communication with interface media 2002, via which chip card 2000 or the device 100 contained in it may exchange data, in a manner known per se, with external devices such as a chip card reader (not shown) or the like. The device 100 of FIG. 4a advantageously has at least the structure illustrated in FIG. 2a. In addition, it is conceivable for a plurality of encoding units 130 or a plurality of identical or different processing modules 120, 120a, 120b to be provided within a device 100, which means that corresponding method steps of a data processing method implemented in device 100 may make use of the advantages of the present invention.

Figure 4B:
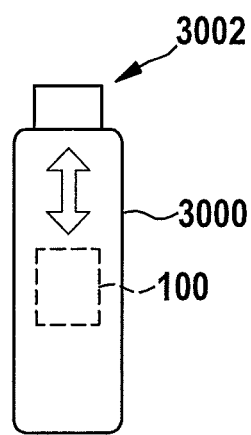

FIG. 4b shows a further application of the present invention. A USB (universal serial bus) data storage medium 3000, which includes a device of the present invention 100 and a USB connecting arrangement 3002, is illustrated.

Figure 5:
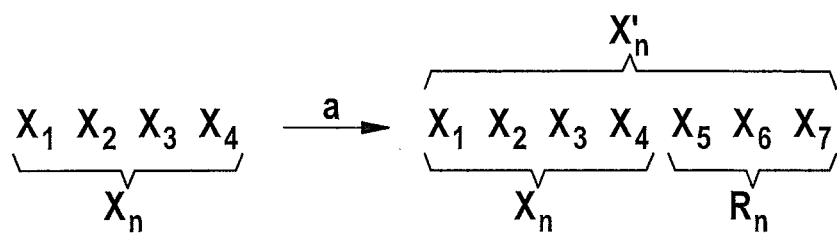
FIG. 5 shows a schematic of an example for a specific embodiment of encoding according to the present invention.

FIG. 5 shows an example of encoding according to the present invention, in light of a data word Xn including four bits (corresponds to a nibble, i.e., half-byte). In FIG. 5, a first bit of data word Xn is denoted by reference character X1, a second bit is denoted by reference character X2, a third bit is denoted by reference character X3, and a fourth bit is denoted by reference character X4. Accordingly, the following notation is also suitable for representing data word Xn: (x1, x2, x3, x4), which corresponds to the side-by-side arrangement of individual bits x1, x2, x3, x4 of data word Xn.

Using encoding by encoding unit 130 (FIG. 2a), data word Xn of FIG. 5 is converted to an encoded data word Xn', cf. arrow a from FIG. 5. As is apparent from FIG. 5, encoded data word Xn' still has the four bits x1, x2, x3, x4 of original data word Xn, as well as three additional bits x5, x6, x7. Thus, in the present case, encoding a is accomplished by appending a bit sequence Rn, which presently has a length of three bits.

The values of individual bits x5, x6, x7 of the bit sequence Rn appended within the scope of the encoding of the present invention may advantageously be selected, for example, such that a desired Hamming distance of encoded data word Xn' from other encoded data words or a desired Hamming weight of encoded data word Xn' is obtained.

FIG. 6 exemplarily shows an encoding table having three columns S1, S2, S3, as may be used, for example, in the encoding unit 130 (FIG. 2a) according to a specific embodiment. Column S1 includes the line numbers of the total of 16 lines of the table from FIG. 6. Second column S2 includes the input data words Xn, which have four bits, in the notation already described above, in which the individual bit positions are each separated by commas and the data word is set in parentheses. Column S3 of the table illustrated in FIG. 6 includes encoded data words Xn', as are assigned by encoding unit 130 of the present invention (FIG. 2a) to respective data words Xn of column S2 of the same line.

The table according to FIG. 6 may be obtained from the sixteen data words Xn, for example, using the following equations or formation rule:

$$Xj'=(x1,x2,x3,x4,0,0,[1-HW(x\|1)]), \text{ if } HW(Xj) \leq 2",$$
and $$Xj'=(\overline{x1,x2,x3,x4},1,[2-HW(x\|1)],[1-HW(x\|1)]), \text{ if } HW(Xj) > 2"$$

where HW(.) indicates the Hamming weight of a data word, ∥ indicates concatenation by the bit, Xj is the jth unencoded data word, and Xj' is the jth encoded data word.

The encoding of the present invention illustrated by the table of FIG. 6 advantageously has the effect that all of the encoded data words (elements of column S3 of the table) have a constant Hamming weight, which means that DPA attacks on device 100 are rendered more difficult, since, in the scope of the processing in processing module 120 of the data words Xn' encoded according to the present invention (FIG. 2a), the same number of state changes of the individual bits of encoded data words Xn' occur for each code word, so that special combinations of state changes may not be directly associated with special code words, which are presently being processed by module 120.

To achieve an 8-bit implementation based on the principle of the present invention, the steps explained above and the encoding of the table according to FIG. 6 may each be applied to two half-bytes ("nibble"), which correspond to an 8-bit data word. Consequently, an 8-bit implementation of the SubBytes( ) function of the AES may realized, for example. The design approach of the present invention may also be scaled highly effectively, so that for a 32-bit implementation, for example, a 32-bit-wide data word is initially broken down into eight half-bytes, which may be within a clock cycle, thus, concurrently, and then the eight half-bytes obtained from this may be encoded according to the present invention.

Figure 7:
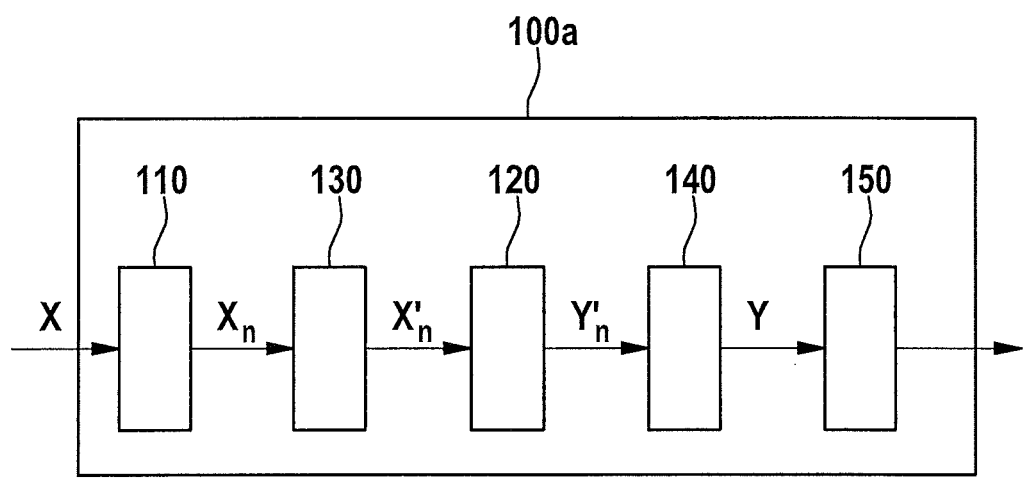
FIG. 7 shows a schematic of a further device according to one specific embodiment.

FIG. 7 shows a further specific embodiment of the present invention, in which a device 100a for processing data is illustrated. On the input side, device 100a receives, in turn, input data X, which are passed on through input interface 110 to subsequent encoding unit 130, for example, in the form of, e.g., input data words Xn containing 4 bits. Encoding unit 130 carries out encoding, through which encoded input data Xn' are obtained. Encoded input data words Xn' are processed in subsequent processing module 120, so that processed, encoded data words Yn' are obtained at the output of processing unit 120. Data words Yn' are then decoded by unit 140, which constitutes a decoding unit, so that decoded, processed data words Y are obtained, which may be outputted via output interface 150 to further units outside of device 100.

In another specific embodiment, components 120 and 140 of FIG. 7 may also be functionally combined with one another.

In general, the principle of the present invention is not limited to encoding in such a manner, that the encoded data words have, as described above, a specifiable Hamming distance and/or a specifiable Hamming weight. On the contrary, according to further specific embodiments, encoding unit 130 (FIG. 1, FIG. 6) may also be alternatively configured in such a manner, that it transforms input data words Xn into encoded data words Xn', using a so-called leakage preserving code. This is achieved, for example, by adhering to the threshold value criterion of the present invention for the difference between measured values Xn1, Xn2 and setpoint value V.

In general, the use of the leakage preserving code has the advantage that data words encoded in such a manner minimize a leakage of information, which is ascertainable, for example, via physically observable or measurable variables Xn1, Xn2 (e.g., measurement of electromagnetic fields, measurement of electrical energy consumption of device 100 or of module 120), via the data processed in module 120.

Figure 8:
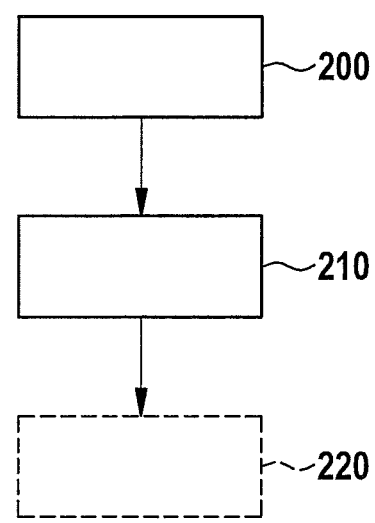
FIG. 8 shows a schematic of a simplified flow chart of a variant of the method according to the present invention.

FIG. 8 schematically shows a flow chart of a specific embodiment of the method according to the present invention. In step 200, one or more input data words Xn are encoded by encoding unit 130 (FIG. 2a). In step 210, encoded data words Xn' obtained in step 200 are processed by processing module 120. Optionally, in step 220, processed data words Yn' are subsequently decoded.

The principle of the present invention of providing encoded data words Xn', which are subjected to further processing, instead of processing unencoded data words Xn, produces the advantage that no randomly-based processes or pseudo-random processes are necessary for the DPA hardening (hardening of device 100 with respect to DPA attacks), which means that the degree of complexity is reduced in comparison with known methods. In addition, device 100 of the present invention may be implemented, for example, using conventional CMOS cells; the device 100, as such, being able to be provided in the form of a monolithic integrated circuit or also as circuit components, which may be integrated into further circuit modules. One further advantage of the present invention is that the proper functioning of device 100 is relatively simple to test, since the present invention is not based on the use of random numbers or pseudo-random numbers.

In addition, device 100 may be implemented on a relatively small chip surface. Since the measures of the present invention, which produce hardening with respect to DPA attacks, are taken on the architecture level, it is possible to easily reuse them in different chip designs, or in general, designs that are intended to utilize the functionality of the present invention.

One further aspect of the present invention is provided by a method for operating a device 100 for processing data, the device 100 having an input interface 110 for receiving input data and a processing module 120 for processing data. In this aspect of the present invention, it is provided that data words Xn obtained at input interface 110 as input data be encoded by an encoding unit 130, in order to obtain encoded data words Xn', and that processing module 120 process encoded data words Xn'; encoding unit 130 using a leakage preserving code for the encoding. Therefore, the core of this aspect of the present invention is providing encoding of the data words before they are processed; particularly advantageous use being made of the leakage preserving code, that is, encoding that allows a reduction in, or complete prevention of leakage in the cryptographic sense during the processing of the encoded data words by device 100.

The present invention may be implemented advantageously in both hardware and software, or in a combination of the two.

In general, by providing encoding unit 130 (FIG. 1), the principal of the present invention renders possible a transformation of input data Xn into encoded data Xn', which constitute a so-called leakage preserving code that is less susceptible to DPA attacks. In other words, the code including encoded data words Xn' exhibits little leakage in the cryptographic sense. This is synonymous to the statement that only little or no side channel information is contained in the encoded data words.

Therefore, using measures known per se, such as measuring electromagnetic emissions of device 100 or measuring its electrical energy consumption or the like, an attacker of device 100 of the present invention may obtain relatively little or no information at all about the data processed in module 120.

As already mentioned above, processing module 120 may execute, e.g., a portion of a cryptographic method or algorithm, or also a complete cryptographic method, e.g., encryption or decryption, e.g., in accordance with the AES cryptography standard.

In this manner, simple scalability of the principle of the present invention is provided.

In order to reduce costs, in the case of a further specific embodiment, the measure of the present invention, including components 110, 120, 130, may be provided, e.g., only for especially security-related processing units of a cryptographic algorithm. Alternatively, all of the processing steps of a device processing data may also be hardened, using the principle of the present invention.

In comparison with conventional countermeasures against side channel attacks, the countermeasures proposed by the present invention, which are based on encoding, have various advantages:

1. Countermeasures based on encoding are of a deterministic nature, which means that they require relatively low computing expenditure and do not require, in particular, the provision of random number generators or pseudo-random number generators.
2. One implementation as an integrated circuit utilizing conventional CMOS cells is easily possible.
3. Due to the independence from random numbers, a test of device 100 of the present invention is, by far, simpler than tests of devices and methods, which are based on the use of random numbers.
4. For implementation, the countermeasures based on the method of the present invention require only relatively little chip surface and few complex codes that must be produced by encoding unit 130.
5. The principle of the present invention may advantageously be applied either to individual components of a device to be protected, or to the entire device.
6. The present invention may be used in a modular manner. For example, a DPA-hardened memory register in the form of device 100 of the present invention may be provided, when processing module 120 takes the form of, e.g., a simple, i.e., conventional memory register R1. In this case, configuration 100 according to FIG. 1 may be provided modularly and also used in greater quantity in a device to be protected.

The measures of the present invention based on encoding eliminate or reduce, to a large extent, the leakage of information through side channels.

In one further advantageous specific embodiment, it may be provided that the code be formed in such a manner, that partial or complete error correction of encoded data words, which are corrupted, e.g., in the course of a so-called fault attack, is possible. This may be accomplished, for example, by adding further bits, which effect an increase in redundancy.

In a further advantageous specific embodiment, it may be provided that processing module 120 be configured to check one or more encoded data words Xn' with a view to whether they are valid data words in the sense of the code used by the encoding unit. In the case of the configuration of FIG. 6, apart from module 120, such a test may also be conducted in unit 140. For example, in the case of encoding by encoding unit 130, the object of which is a constant Hamming weight (e.g., all of encoded data words Xn' have a constant Hamming weight), processing module 120 may check if an encoded data word Xn' supplied to it actually has the Hamming weight in question. If not, it may be concluded that, e.g., a so-called fault injection attack is being carried out on device 100, in the scope of which false code words are deliberately injected, e.g., into the connection between components 130 and 120, in order to allow a more efficient DPA attack. The present invention's check of encoded data words Xn', e.g., in module 120 or 160, may prevent this. In one advantageous specific embodiment, the test described above may be conducted, for example, using a so-called membership test for encoded data words.

Further advantageous specific embodiments are described below.

According to tests of the Applicant, a side channel leakage allows inferences to be made about the data Xn' processed internally in device 100 and therefore renders a determination, e.g., of a normally secret cryptographic key possible. In other words, a side channel leakage contains information about the data processed internally. One example of this is the data-dependent current consumption in CMOS circuits, as is indicated by measured value Xln in the above-described specific embodiments of device 100.

Side channel leakage L of an observable internal variable V' of device 100 may be defined as a function f( ) of this variable, thus: L=f(V').

A practical example of variable V' would be an output value of the AES SubBytes operation. Practical examples of function f(V') would be, e.g., the measured current consumption, the measured electromagnetic radiation, but also abstracted variables such as Hamming weight (HW) or Hamming distance (HD) of V'. The last two examples, HW and HD, are indeed abstract, but ultimately result in a data-dependent, physical behavior of device 100, e.g., a data-dependent current consumption.

In addition, an average value M of side channel leakage L for all possible values v' of variable V' may be defined, i.e., M=Mean(L), as well as a compatible norm ||v'||, in the example, the absolute value function |v'|.

Now, according to one specific embodiment of the present invention, a code is a mapping, which assigns each internal, non-observable variable v of V one or more values v' of V':C:v–>v'. A leakage preserving code is then defined as a code for which the following applies for all v': ||f(v')−M||<=epsilon, where "epsilon" denotes a specifiable threshold value (threshold).

In a further specific embodiment, the inequality ||f(v')−M||<=epsilon does not have to be true for all v', but it is sufficient, e.g., when a portion of the values v' satisfies this condition.

In order to further clarify the above explanations, two additional examples are given below.

EXAMPLE 1

L=f(V') is the data-dependent current consumption of a cryptographic circuit (e.g., a component of device 100 according to FIG. 2a) and is measured as a voltage drop across a shunt resistor (normal procedure in a side channel attack). Now, epsilon is advantageously selected to be less than the quantization error of the digital storage oscilloscope, which is used for measuring the voltage drop (i.e., epsilon is practically no longer measurable). A leakage preserving code is then a code, in which the data-dependent current consumption f(V') does not deviate from the average current consumption by more than epsilon for any value v' of V', thus, when |f(v)−M|<=epsilon is true.

EXAMPLE 2

According to a further specific embodiment, a code used by encoding unit 130 has a constant Hamming weight (HG) of 2, that is, all values Xn' have an HG=2. If function f(V') is selected to return the Hamming weight of the values v' of V' and an epsilon equal to zero is selected, then the indicated code is a leakage preserving code, since |f(v')−M|<=epsilon is true, because average value M of the Hamming weight of the code words is 2 and none of the code words deviate from it by more than the epsilon selected (=0) (|Hw(v')−2|<=0, for all v', since Hw(v')=2 for all v').

EXAMPLE 3

In one specific embodiment, a so-called "one-hot encoding"-based code is provided, in order to obtain a constant Hamming distance. Instructions by way of example: determine a sequence of all possible input words, and then number them integrally from 0 on up, with an increment of 1. This numbering shall be i. Assign each input code word exactly the code word x, in which the ith bit (alternatively: counting the bits from left to right, but uniformly) is set (1) and all other bits are not set (0). This code is obviously HD-constant, since a particular bit j is only set in exactly one code word (the one having numbering i). Consequently, HW(x)=1 and HD(x)=2 are true for all x.

Note: the first step (order, numbering) is mostly achieved, using the "natural interpretation" of an input word as a positive integer; therefore, this step is only a change of notation and does not require any (computing) expenditure at all.

Further variant: invert the code word from the above-mentioned variant and use this as a code word. There is a difference, e.g., based on the characteristics of a bus system, such as preloading.

A further example of an HD-constant code: Walsh-Hadamard code. Advantages: the code is locally decodable, that is, the decoder only has to evaluate a subset of the code word, in order to ascertain a portion of the original word. This renders trade-offs possible as a function of the structure of the processing unit. The code is orthogonal. A consequence of this is that a stream of code words is not distinguishable from "chance," as long as one does not know the specific code (that is, its parameterization). Thus, it would be possible to change the code regularly, for example, for production lots of device 100 or different projects or customers. This has the advantage that attackers must generate new profiles, when they change the "class."

What is claimed is:

1. A device for processing data for data protection, the device comprising:
    an input interface to receive input data including a temporal sequence of input data words;
    an encoding unit to encode each input data word received at the input interface to obtain a corresponding encoded data word; and
    a processing module to process each encoded data word to produce a corresponding processed data word,
    wherein measured values of a physical property of the device characterize the processing of the encoded data words performed by the processing module, and the encoding unit encodes the input data words so that a specifiable proportion equal to at least 50% of all measured values exhibit a difference from a setpoint value that is less than or equal to a specifiable threshold value.

2. The device of claim 1, wherein the set point value is selected to be equal for all of the measured values.

3. The device of claim 2, wherein an average value over all possible values of the measured values is selected as a set point value.

4. The device of claim 1, wherein in each instance, a different threshold value is provided for at least two measured values or data words assigned to these measured values.

5. The device of claim 1, wherein the measured values include scalar variables or vector variables or are in matrix form.

6. The device of claim 1, wherein the measured values represent an electrical energy consumption or of at least one component of the device.

7. The device of claim 1, wherein the measured values represent a Hamming weight or a Hamming distance.

8. The device of claim 1, wherein the processing module includes at least one register to store at least one of the encoded data words at least temporarily.

9. The device of claim 1, wherein the encoding unit is configured to encode the input data words by adding a specifiable number of bits to each of the input data words to set the difference from the setpoint value of the specifiable proportion of all measured values to less than or equal to the specifiable threshold value.

10. The device of claim 1, wherein the encoding unit is configured to encode the input data words by adding a specifiable number of bits to each of the input data words, the specifiable number of added bits selected in such a manner that a specifiable proportion of all encoded data words among themselves have at least one of: a specifiable Hamming distance, or a specifiable Hamming weight.

11. The device of claim 1, wherein at least part of the device is in the form of an integrated CMOS circuit.

12. The device of claim 1, wherein the processing module is in the form of a data bus or includes a data bus.

13. The device of claim 1, wherein the specifiable threshold value is nonzero.

14. The device of claim 1, wherein the processing module includes a cryptographic unit to execute at least a portion of a cryptographic process on at least one of the encoded data words to produce the corresponding processed data word.

15. The device of claim 1, wherein the encoding unit is configured to encode the data words by adding a specifiable number of bits to each of the data words so that all encoded data words among themselves have at least one of: a constant Hamming distance, or a constant Hamming weight.

16. A method for operating a device for processing data for data protection, the method comprising:
   receiving, at an input interface of the device, input data including a temporal sequence of input data words;
   encoding, by an encoding unit, each input data word, received at the input interface to obtain a corresponding encoded data word; and
   processing, by a processing module, each encoded data word to produce a corresponding processed data word,
   wherein measured values of a physical property of the device characterize the processing of the encoded data words performed by the processing module, and the encoding unit encodes the input data words so that a specifiable proportion equal to at least 50% of all measured values exhibit a difference from a setpoint value that is less than or equal to a specifiable threshold value.

17. The method of claim 16, wherein a calibration is carried out, in which specifiable calibration data words are processed by the processing module, and in which measured values corresponding to the calibration data words are ascertained.

18. The method of claim 17, wherein the encoding by the encoding unit is performed as a function of the measured values corresponding to the calibration data words.

19. The method of claim 16, wherein the encoding unit uses a leakage preserving code for the encoding.

20. The method of claim 16, wherein the processing includes storing, using at least one register, at least one of the encoded data words at least temporarily.

21. The method of claim 16, wherein the processing includes executing, using a cryptographic unit, at least a portion of a cryptographic process on at least one of the encoded data words to produce the corresponding processed data word.

22. The method of claim 16, wherein the encoding includes adding a specifiable number of bits to each of the input data words to set the difference from the setpoint value of the specifiable proportion of all measured values to less than or equal to the specifiable threshold value.

23. The method of claim 16, wherein the encoding includes adding a specifiable number of bits to each of the input data words, the specifiable number of added bits selected in such a manner that a specifiable proportion of all encoded data words among themselves have at least one of: a specifiable Hamming distance, or a specifiable Hamming weight.

24. The method of claim 16, wherein the encoding includes adding a specifiable number of bits to each of the data words so that all encoded data words among themselves have at least one of: a constant Hamming distance, or a constant Hamming weight.

25. A non-transitory, machine-readable storage medium having program instructions, which when executed by a processing device perform a method of operating a device for processing data, the method comprising:
   receiving, at an interface of the device, input data including a temporal sequence of input data words;
   encoding, by an encoding unit, each input data word received at the input interface to obtain a corresponding encoded data word; and
   processing, by a processing module, each encoded data word to produce a corresponding processed data word,
   wherein measured values of a physical property of the device characterize the processing of the encoded data words performed by the processing module, and the encoding unit encodes the input data words so that a specifiable proportion equal to at least 50% of all measured values exhibit a difference from a setpoint value that is less than or equal to a specifiable threshold value.

* * * * *